United States Patent [19]

Mitsui et al.

[11] B 4,056,759

[45] Nov. 1, 1977

[54] DRIVING SYSTEM FOR MOVING PATHS OR ESCALATORS

[75] Inventors: Nobuo Mitsui; Akinori Watanabe; Takeshi Oohira; Kazuhiko Kawauchi, all of Katsuta; Shoichi Nakao, Mito; Katsuya Teranishi, Katsuta, all of Japan

[73] Assignee: Hitachi, Ltd., Tokyo, Japan

[21] Appl. No.: 475,801

[22] Filed: June 3, 1974

[44] Published under the second Trial Voluntary Protest Program on March 30, 1976 as document No. B 475,801.

[30] Foreign Application Priority Data

June 4, 1973   Japan .................................. 48-61894

[51] Int. Cl.² .............................................. H02P 7/00
[52] U.S. Cl. ........................ 318/98; 318/99; 198/330
[58] Field of Search ............... 318/39, 85, 96, 98, 318/99; 198/330

[56] References Cited

U.S. PATENT DOCUMENTS

| | | | |
|---|---|---|---|
| 1,871,696 | 8/1932 | Jackson | 318/39 |
| 2,411,162 | 11/1946 | King | 318/39 |
| 2,727,694 | 12/1955 | Helmick, Jr. et al. | 318/39 X |
| 2,864,040 | 12/1958 | Trotsky | 318/99 X |
| 3,076,906 | 2/1963 | Simo | 318/85 X |
| 3,265,947 | 8/1966 | Woehler | 318/85 X |
| 3,305,765 | 2/1967 | Rittner | 318/39 X |
| 3,353,384 | 11/1967 | Kain et al. | 318/99 X |
| 3,364,404 | 1/1968 | Carlson | 318/85 X |
| 3,658,166 | 4/1972 | Hara et al. | 198/16 |
| 3,731,166 | 5/1973 | Inuzuka et al. | 318/35 |
| 3,845,366 | 10/1974 | Metzler et al. | 318/99 |

*Primary Examiner*—Robert K. Schaefer
*Assistant Examiner*—M. Ginsburg
*Attorney, Agent, or Firm*—Craig and Antonelli

[57] ABSTRACT

A driving system for moving paths or escalators which use an endless chain adapted to be circulated between a path for transporting passengers, comprising a first and a second sprocket disposed at one end portion and substantially middle portion of the path, respectively, a first and a second induction motor coupled respectively to the first and second sprockets and each having the same rating output the sum of which is selected to be substantially equal to a maximum capacity of the system, an induction coupling interposed between the second sprocket and the second induction motor, means for detecting a current flow through the first induction motor, means for setting a reference value, and a thyristor amplifier for exciting the induction coupling in response to an excess developed when an output of the detecting means exceeds the reference value.

16 Claims, 7 Drawing Figures

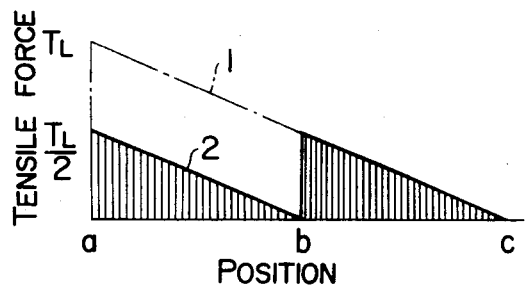
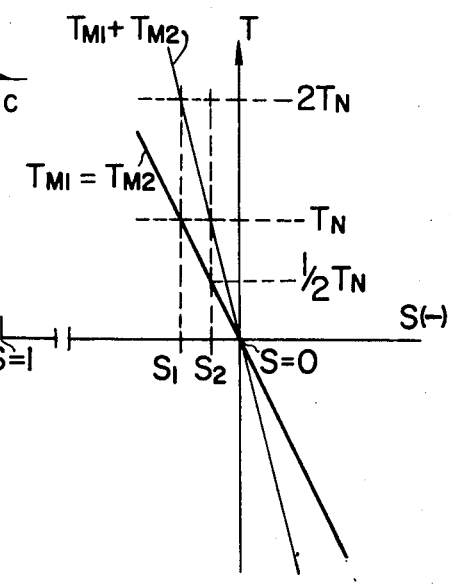
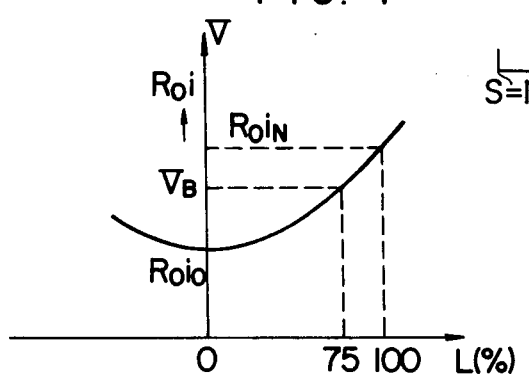
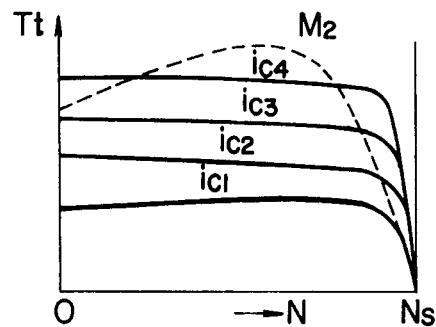

DRIVING SYSTEM FOR MOVING PATHS OR ESCALATORS

BACKGROUND OF THE INVENTION

The present invention relates to an improvement of a driving system for moving paths or escalators which use an endless chain adapted to be circulated between a path for transporting passengers.

The moving path or escalator usually employed an endless chain applied between two sprockets disposed in a spaced relationship, one of the two sprockets is driven by an induction motor coupled therewith. In a horizontally movable moving path or an ascending escalator an induction motor is coupled to a sprocket installed at the destination side whereas in a descending escalator the induction motor is coupled to the sprocket installed at the entrance side. The endless chain for use in a long distance moving path or long stroke escalator is required to be of a high strength structure, because the chain is driven at one driving point and the whole tensile force concentrates at this driving point, resulting in an extremely magnified size of the whole system. In other words, as the passenger storing capacity of the system becomes large, a tensile force acting on the driving point of the endless chain increases. On the other hand, since the strength of the endless chain increases stepwise with a certain step, the endless chain requires a very great capacity as it becomes longer. The endless chain resistive to a large tensile force suffers from an increase in chain weight and in chain size. This magnifies stepwise the size of a driving device for driving the endless chain together with the loaded weight.

To eliminate these disadvantages, it has been suggested that another sprocket be provided at substantially the middle portion of the endless chain to suppress a maximum tension which the endless chain assumes and the sprocket is driven by a second induction motor for the purpose of smoothing the tension distribution in the endless chain.

In this prior art, however, a pair of induction motors are always in operation, which is disadvantageous in economical standpoint of view. Further, when both of the two induction motors are controlled, the control devices becomes complicated and expensive and reliability of the system is lowered. Further, there is an inconvenience that, when the system is loaded with a concentrated load at the intermediate portion between the two driving source sprockets, the second sprocket pushes the chain from the rear of the load with a result that there generates a minus tension in the chain between the first and second sprockets to provide a slackness of the chain so that the chain is off its guide.

SUMMARY OF THE INVENTION

Accordingly, a principal object of the present invention is to eliminate such an inconvenience as stated above and to provide a compact, economical and highly reliable driving system for moving paths or escalators.

In accordance with the present invention, there are provided, at one end portion and substantially the middle portion of a moving path or escalator, sprockets to which motors are coupled separately. Further, there are provided means for detecting a loaded weight acting upon the endless chain or detecting a quantity corresponding thereto and means for controlling a torque to be applied upon the sprocket disposed at the middle portion in response to an output of the detecting means.

Preferably, the loaded weight is detected by use of a current flow through a first induction motor coupled to a first sprocket disposed at one end portion of the path of the endless chain, and when a load for the first induction motor reaches a predetermined value, for example 75 to 80 percent of the full load thereof a second sprocket disposed at the middle portion of the endless chain also receives a torque from a second induction motor. As the loading weight increases beyond the predetermined value, the torque to be applied upon the second sprocket by the second motor is increased until the second sprocket receives preferably 100 percent torque from the second motor at the time when the first sprocket receives 100 percent output from the first motor. For the purpose of controlling the torque applied upon the second sprocket, preferably an induction coupling is interposed between the second sprocket and the second motor.

With this construction, when the loaded weight increases to increase the maximum tension in the endless chain, the second sprocket generates a driving force so as to disperse the tension distribution in the endless chain. As the loaded weight is further increased, the second sprocket receives a further increased driving force so that the first and second sprockets cooperate to transport the load under suppression of the maximum tension.

As a result, the tension in the endless chain is suppressed together with prevention of increase in size of the same, thereby miniaturizing the whole system and assuring the provision of an economical driving system.

BRIEF DESCRIPTION OF THE DRAWING

FIG. 2 is a graph useful to explain the tension distribution in the endless chain.

FIG. 3 shows slip S versus torque T characteristics of two induction motors.

FIG. 4 shows load L versus current flow I characteristics of the induction motor.

FIG. 5 shows speed N versus torque Tt characteristics, with the parameter of exciting currents $i_c$ of the induction coupling, in which a dotted curved line $M_2$ represents a performance of the induction motor.

DESCRIPTION OF THE PREFERRED EMBODIMENT

Figure 1:
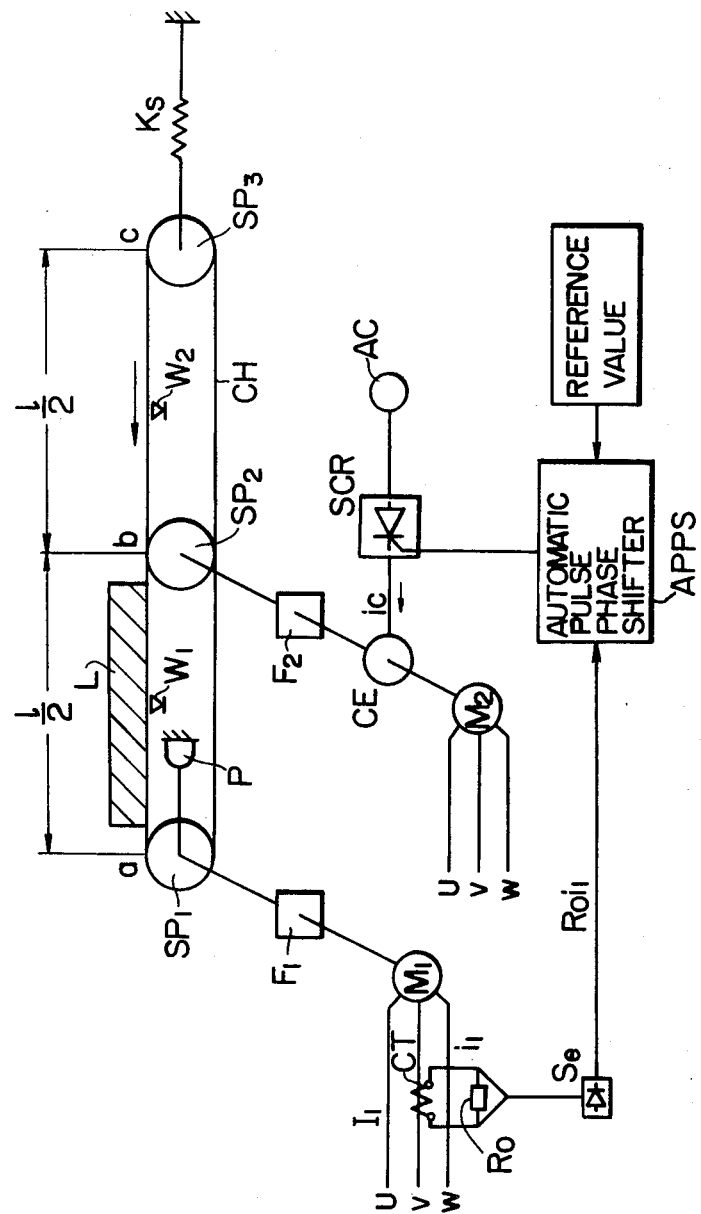
FIG. 1 is a schematic diagram of a driving system for moving paths embodying the invention.

Referring now to FIG. 1, there is provided an endless chain CH applied between two sprockets $SP_1$ and $SP_3$, the sprocket $SP_1$ being fixed mechanically while the sprocket $SP_3$ is supported by a tension spring KS so as to apply a tensile force to the endless chain CH. To the sprocket $SP_1$ is coupled an induction motor $M_1$ through a reduction gear F1. The induction motor $M_1$ receives power from a three-phase AC source U, V, W and in turn drives the sprocket $SP_1$.

When, in such an arrangement the endless chain is supplied with a driving force only by the sprocket $SP_1$ provided at one end part of the moving path, the endless chain assumes a maximized tension at a portion $a$.

Accordingly, on the assumption that passengers are uniformly distributed throughout portions $a$, $b$ and $c$, a tensile force may be distributed over the whole path as shown in FIG. 2 at a chained line 1.

For this reason, the endless chain must be designed to have so large a strength as to withstand an expected maximum tension at the portion $a$. Generally, the maximum capacity of a moving path or escalator is determined by the area of a portion on which a prescribed number of passengers ride. Such area corresponds to a product of the width of the endless chain and the length $\overline{ac}$. However, the larger is the maximum capacity, the larger will be the maximum tension $T_L$ which the endless chain CH assumes at the portion $a$, resulting in a magnified size of the endless chain in compliance with the strength enhancement.

To solve this problem, a sprocket $SP_2$ is provided for an approximate middle portion $b$ of the moving path or escalator, the sprocket $SP_2$ being coupled with an induction motor $M_2$ through a reduction gear $F_2$. With this construction wherein a chain driving force is also supplied to the middle portion, a tensile force may be distributed as shown in FIG. 2 at a solid line 2 with the result that the maximum tension is reduced by about half. In the case where the whole length of the moving path is $l$ and the second sprocket $SP_2$ is placed at the portion $b$ spaced from end portions $a$ and $c$ by a distance $l/2$, i.e. at the middle portion, when the passengers come up to a prescribed number and thus the passengers equivalent to the maximum capacity are distributed uniformly over portions $a$, $b$ and $c$, a tensile force which the endless chain assumes at each of the portions $a$ and $b$ is $T_L/2$ as shown in FIG. 2 at the solid line 2. Accordingly, it is sufficient for the endless chain to be designed resistive to $T_L/2$.

Incidentally, a continuous operation of the respective induction motors $M_1$ and $M_2$, for the purpose of attaining the above object, is apparently disadvantageous from the view of economy. In addition, the provision of an individual control device for each of the two induction motors not only results in a complicated and expensive driving system but also reduces the reliability of the system in view of safety-first.

In this respect, according to the present invention a control device for the induction motor $M_1$ driving the sprocket $SP_1$ is deleted and a loading weight or a quantity corresponding thereto is detected to control a torque to be applied upon the sprocket $SP_2$. For the detection of loading weight, a load acting upon a chain guide may be detected by weighing machines $W_1$ and $W_2$ and a sum or a difference of outputs from these weighing machines is derived to control a torque to be applied upon the sprocket $SP_2$; or a static load created at the bearing of the sprocket $SP_1$ may be detected by a load detector P.

However, these detecting means require an electromechanical converter in addition to a pure mechanical device. In contrast therewith, a method of approximately detecting the loading weight by using a current flow $I_1$ through the induction motor $M_1$ is very simple.

To control the torque to be applied upon the sprocket $SP_2$, the torque of the induction motor $M_2$ per se may be controlled as well.

Although the respective motors $M_1$ and $M_2$ are by no means limited to a induction motor, it is preferred to select motors having the same characteristics and capacity. Assuming that induction motors are used, slip S versus torque T characteristics are shown in FIG. 3.

Since the respective torque performances $T_{M1}$ and $T_{M2}$ of the two induction motors $M_1$ and $M_2$ are the same, assume that the total loading torque of the system is 2 $T_N$, each motor generates a rating torque $T_N$ with the full load so that respective motors share half the full load thereby to be rotated at a speed corresponding to a slip of $S_1$.

The moving path or escalator of this type is utilized for people. Accordingly, when loaded with the maximum load of the system, a uniform and continuous load is created, and between the driving portions $a$ and $b$ and between driving portions $b$ and $c$ is applied the maximum loads proportional to the chain spans, each of which is less than one-half the full load of the system. For this reason, if the maximum torque of the system is designed less than the sum of 2 $T_N$ of the outputs from the two motors, the maximum tension at the driving portions $a$ and $b$ can be decreased to less than $T_N$. With this constitution, however, if a concentrated load L acts whose length is shorter than the distance between the driving portions $a$ and $b$ as shown in FIG. 1, a required torque is $T_N$ and as a result, the respective motors tend to operate at a speed corresponding to a slip of $S_2$ with the torque of ½ $T_N$ as seen from FIG. 3. Thus, the motor $M_1$ pulls the concentrated load L with the ½ $T_N$ torque and the motor $M_2$ pushes it with the corresponding ½ $T_N$ torque so that a portion of the endless chain between the concentrated load L and the driving portion $b$ is sent excessively. Since the chain can not transmit forward a force when it is depressed from behind, the excessively sent portion of the endless chain is slackened. With an excessive slackness, there is a danger in that the endless chain is partially corrugated or brought into disengagement from the sprocket $SP_2$ at the portion $b$. To eliminate the drawback, it is advisable to interpose means for electrically controlling the transmission torque, for example an induction coupling CE, between the output shaft of the motor $M_2$ and the reduction gear $F_2$, thereby assuring control devoid of the excessive sending or slackness phenomenon of the endless chain. When the primary current $I_1$ of the motor $M_1$ is derived through a current transformer CT to be measured as a voltage across a fixed resistor $R_o$, the voltage varies along a quadratic curve having the apex at a voltage $R_o\, i_o$ corresponding to a no-load current $i_o$ as shown in FIG. 4. In the figure, the ordinate represents the voltage V proportional to the primary current $I_1$ and the abscissa represents the load L is percent (%).

Now, the voltage $R_o i$ proportional to the primary current, $i$ being the load current, is compared with a predetermined signal $V_B$ which for example corresponds to the 75 percent load in an automatic pulse phase shifter APPS, (such as a magnetic amplifier) and only when $R_o i > V_B$, the gate of a thyristor amplifier SCR is fixed to excite the induction coupling CE. FIG. 5 illustrates rotation number N versus transmission torque $T_t$ characteristics, where $ic_1$ to $ic_4$ are different exciting currents which satisfy $ic_1 < ic_2 < ic_3 < ic_4$. Since the transmission torque $T_t$ varies in approximate proportion to the exciting current $i_c$, when the torque performance of the motor $M_2$ is selected as shown at a chained curved line the output torque can be controlled from 0 to 100 percent.

Figure 6:
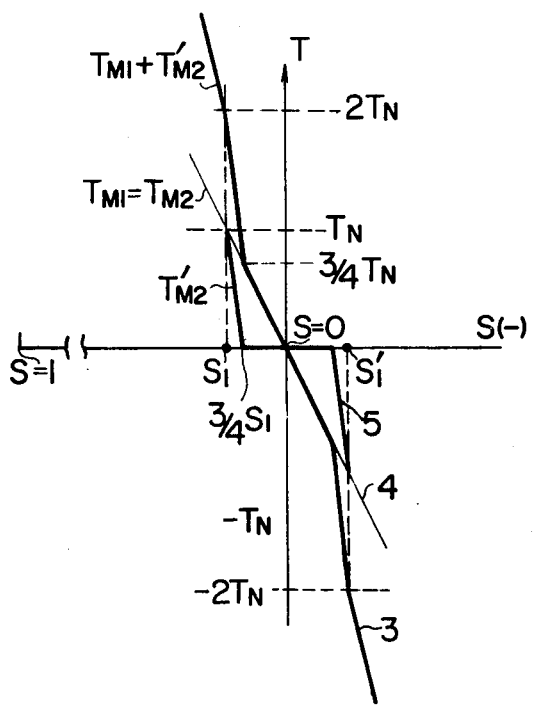
FIG. 6 shows slip S versus torque T characteristics of the driving system embodying the invention.

When, by adjusting the gain of the automatic pulse phase shifter APPS, the induction coupling is set to have a coupling force of 100 percent at a voltage of $R_o i_N$ which corresponds to the rating load current $i_N$ of the motor $M_1$, the torque versus slip characteristics of the motor $M_2$ can be modified as shown in FIG. 6 at a solid line $T'_{M2}$ so that the resultant torque of this driving mechanism becomes $T_{M1}+T_{M2}'$ as shown at a solid line ($T_{M1}+T'_{M2}$) in FIG. 6 which shows torque versus slip characteristics. More particularly, below a slip of ⅜$S_1$ which corresponds to three-eights full load of the whole system, the system are operated only by the motor $M_1$ assuming no controlling and the driving torque performance T is expressed as T = KS, where K is a proportional constant. Above a slip of S which corresponds to a load ranging from three-eights full load to full load and which is ⅜$S_1 < S \leqq S_1$, the driving torque performance is expressed as $$T = KS + 4K(S - ⅜S_1).$$

As a result, the motor $M_2$ does not participate in a complemental operation below the three-eights full load, but at one-half the full load at which the maximum excessive sending phenomenon is caused the motor $M_1$ delivers the output of 0.75 $T_N$ and the motor $M_2$ delivers the output of 0.25 $T_N$ such that the motor $M_2$ pushes slightly the concentrated load L. Practically, however, the tension spring $K_s$ provided for the idle sprocket $SP_3$ has the strength of about 0.5 $T_N$ so that no excessive sending of the chain is created at the driving portion b. Further, at the full load, the two motors each generate the rating torque $T_N$ and share the same amount of load with the result that the maximum tension of the endless chain cannot exceed the equivalent torque $T_N$. Although the foregoing description has been given with a moving path, the same effect may be obtained with an escalator provided with the sprocket $SP_1$ at its upper portion and the sprocket $SP_3$ at its lower portion.

With an escalator, its operation in the direction reverse to an arrow of FIG. 1, i.e. descending operation can enjoy the same effect. In the descending operation, the motor $M_1$ rotates at a speed higher than the sychronous speed and it is brought into a so-called regenerative breaking state. Under this state, since the primary current has an approximately symmetric characteristic to the right half of FIG. 4, a performance as shown in FIG. 6 at 3 can be obtained by adjusting the reference voltage $V_B$. The torque versus slip characteristics of the motors $M_1$ and $M_2$ during descending operation are shown in FIG. 6 at solid lines 4 and 5, respectively.

Figure 7:
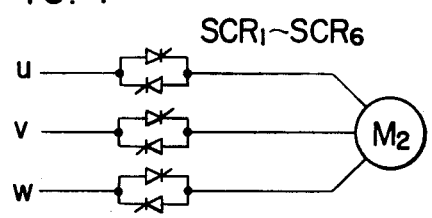
FIG. 7 is a circuit diagram of one example of a primary voltage controller for the induction motor.

Eliminating induction coupling CE, the primary voltage of the motor $M_2$ may be controlled for the purpose of regulating the output of the motor $M_2$. For example, where thyristor anti-parallel circuits $SCR_1$ through $SCR_6$ are inserted in the input side of the motor $M_2$ as shown in FIG. 7, the primary voltage of the motor $M_2$ is controlled to regulate the output thereof, thereby attaining the same effect. Still further, the motor $M_1$ of an induction motor and the motor $M_2$ of a DC motor are used in combination, and an application voltage to the DC motor may be controlled in accordance with the primary current of the induction motor.

A moving path driven by a single driving motor with a 25 ton standard chain can have the stroke less than 500 meters, and even with modern 40 ton chain of attainable maximum capacity, the maximum stroke is limited to 800 meters. On the contrary, according to the present invention it is possible to manufacture a moving path having a stroke of 1 kilometer with the 25 ton standard chain. The manufacturing cost can be reduced by 10 to 15 percent.

Further, the present invention is advantageous from the view point of economy since it is clear that more than three motors can be readily cooperated when the output of the subsequent or previous motor is controlled in accordance with the load condition of the first motor.

What we claim is:

1. A driving system for moving paths or escalators which use an endless chain adapted to be circulated between a path for transporting passengers, comprising:
    a first and a second sprocket disposed at one end portion and substantially middle portion of said path, respectively;
    a first motor for driving said first sprocket;
    a second motor for driving said second sprocket;
    means for detecting a quantity corresponding to a loaded weight acting upon said endless chain;
    means for setting a reference value; and
    means for controlling a torque to be applied upon said second sprocket in response to an output from said detecting means, said torque controlling means including means for increasing the torque to be applied upon said second sprocket in response to an excess developed when the output of said detecting means exceeds said reference value.

2. The driving system according to claim 1 wherein a sum of rating outputs of said first and second motors is selected to be substantially equal to the maximum capacity of the system.

3. The driving system according to claim 2 wherein the respective rating outputs of said first and second motors are selected to be substantially equal to each other.

4. The driving system according to claim 1 wherein said means for detecting a quantity corresponding to a loaded weight acting upon said endless chain includes means for detecting a current flow through said first motor.

5. The driving system according to claim 1 wherein said means for controlling the torque to be applied upon said second sprocket includes an induction coupling interposed between said second motor and said second sprocket.

6. The driving system according to claim 1, wherein said second motor comprises an induction motor and said means for controlling the torque to be applied upon said second sprocket includes thyristor means interposed between an AC source and said induction motor for regulating a voltage to be applied to said induction motor.

7. The driving system according to claim 1, wherein only a single torque controlling means is provided, said single torque controlling means controlling the torque applied to the second sprocket.

8. The driving system according to claim 1, wherein said means for setting a reference value provides a value such that for a predetermined portion of the load weight range acting upon said endless chain said torque controlling means provides 0 torque for said second motor, said torque controlling means providing an increasing torque in response to the output from said detecting means exceeding said reference value.

9. The driving system according to claim 1, wherein said means for setting a reference value sets a predetermined reference value corresponding to a predetermined load condition of said first motor.

10. The driving system according to claim 1, wherein said torque controlling means applies a torque to said second sprocket when the output of said detecting means exceeds said reference value which is a predetermined value, and said means for increasing the torque varies the torque applied to said second sprocket in accordance with the amount of the output of said detecting means above said predetermined reference value.

11. The driving system according to claim 1, wherein said torque controlling means controls the torque applied to said second sprocket to control slackness in the endless chain and thereby avoid excessive slackness phenomenon in the endless chain.

12. A driving system for moving paths or escalators which use an endless chain adapted to be circulated between a path for transporting passengers, comprising: a first and a second sprocket disposed at one end portion and substantially middle portion of said path, respectively; a first induction motor coupled to said first sprocket; a second induction motor coupled to said second sprocket through an induction coupling; means for detecting a current flow through said first induction motor; means for setting a reference value; means for comparing an output of said detecting means with said reference value; and a thyristor amplifier for exciting said induction coupling in response to an excess developed when the output of said detecting means exceeds said set reference value.

13. The driving system according to claim 12, wherein only a single induction coupling is provided, said single induction coupling controlling the output of said second induction motor supplied to said second sprocket.

14. The driving system according to claim 12, wherein said means for setting a reference value sets a predetermined reference value corresponding to a predetermined load condition of said first motor.

15. The driving system according to claim 12, wherein said thyristor amplifier excites said induction coupling when the output of said detecting means exceeds said reference value which is a predetermined value and varies the excitation of said induction coupling in accordance with the amount of the output of said detecting means above said predetermined reference value.

16. The driving system according to claim 12, wherein said thyristor amplifier excites said induction coupling to control slackness in the endless chain and thereby avoid excessive slackness phenomenon in the endless chain.

* * * * *